(12) United States Patent
Sekimoto (10) Patent No.: US 11,525,660 B2
(45) Date of Patent: Dec. 13, 2022

(54) SURFACE SHAPE MEASURING DEVICE AND SURFACE SHAPE MEASURING METHOD

(71) Applicant: Tokyo Seimitsu Co., Ltd., Tokyo (JP)

(72) Inventor: Michihiro Sekimoto, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 17/749,209

(22) Filed: May 20, 2022

(65) Prior Publication Data

US 2022/0276037 A1    Sep. 1, 2022

Related U.S. Application Data

(63) Continuation of application No. PCT/JP2020/041347, filed on Nov. 5, 2020.

(30) Foreign Application Priority Data

Nov. 22, 2019  (JP) .............................. JP2019-211559

(51) Int. Cl.
  *G01B 5/20*  (2006.01)
  *G01B 3/00*  (2006.01)
  (Continued)

(52) U.S. Cl.
  CPC .............. *G01B 5/201* (2013.01); *G01B 3/002* (2013.01); *G01B 5/0004* (2013.01); *G01B 5/25* (2013.01)

(58) Field of Classification Search
  CPC ...... G01B 5/201; G01B 3/002; G01B 5/0004; G01B 5/25
  See application file for complete search history.

(56) References Cited

U.S. PATENT DOCUMENTS 2,807,093 A * 9/1957 Sanchez ............... B23Q 16/005
                                                    33/642
3,045,510 A * 7/1962 Brainard .............. G05B 19/351
                                                    33/710
(Continued)

FOREIGN PATENT DOCUMENTS

CN          2786552 Y     6/2006
CN          1987348 A     6/2007
(Continued)

OTHER PUBLICATIONS

Decision to grant a patent issued in JP 2019-211559 dated Sep. 8, 2020.
(Continued)

*Primary Examiner* — Yaritza Guadalupe-McCall
(74) *Attorney, Agent, or Firm* — Birch, Stewart, Kolasch & Birch, LLP (57) ABSTRACT

When an index table is installed on a rotary table in a surface shape measuring device, deterioration in measurement accuracy can be suppressed. The surface shape measuring device includes: a rotary table which is configured to place a workpiece thereon and to be freely rotatable around a rotation center axis; and a detector configured to detect a displacement of a probe brought into contact with the workpiece. The rotary table has a centering mechanism configured to align a center axis of the workpiece and the rotation center axis. An index table freely detachably mounted on the rotary table is provided, the index table configured so as to be able to perform indexing along a first axis and a second axis which are perpendicular to the rotation center axis. Eccentric load cancelling means configured to cancel an eccentric load caused by the indexing of the index table is provided.

8 Claims, 11 Drawing Sheets

(51) Int. Cl.
  *G01B 5/00* (2006.01)
  *G01B 5/25* (2006.01)

(56) References Cited

U.S. PATENT DOCUMENTS

| | | | | |
|---|---|---|---|---|
| 4,918,826 | A * | 4/1990 | Moore | G01B 11/26 |
| | | | | 33/645 |
| 7,191,540 | B1 * | 3/2007 | Brewer | G01B 5/20 |
| | | | | 33/503 |
| 8,707,573 | B2 * | 4/2014 | DeRoche | B23P 21/00 |
| | | | | 33/813 |
| 10,724,841 | B2 * | 7/2020 | Morii | G01B 5/016 |
| 2004/0244208 | A1 | 12/2004 | Sawada et al. | |
| 2007/0146855 | A1 | 6/2007 | Lin | |
| 2011/0138895 | A1 * | 6/2011 | Yamada | G01B 5/28 |
| | | | | 73/105 |
| 2013/0100170 | A1 | 4/2013 | Matsumura et al. | |
| 2013/0255091 | A1 | 10/2013 | Fukuta et al. | |
| 2016/0114441 | A1 * | 4/2016 | Baur | B23C 5/26 |
| | | | | 173/217 |
| 2016/0305894 | A1 | 10/2016 | Matsumiya et al. | |
| 2018/0304379 | A1 | 10/2018 | Shimizu et al. | |
| 2021/0325846 | A1 * | 10/2021 | Kawasaki | B23Q 15/12 |

FOREIGN PATENT DOCUMENTS

| | | | | |
|---|---|---|---|---|
| CN | 201093994 | Y | 7/2008 | |
| CN | 101509819 | A | 8/2009 | |
| CN | 101706256 | A | 5/2010 | |
| CN | 106053495 | A | 10/2016 | |
| CN | 108136512 | A | 6/2018 | |
| CN | 109406049 | A | 3/2019 | |
| JP | 62-110885 | A | 5/1987 | |
| JP | 10-286687 | A | 10/1998 | |
| JP | 2001-343228 | A | 12/2001 | |
| JP | 2004-358611 | A | 12/2004 | |
| JP | 2009-34756 | A | 2/2009 | |
| JP | 2010-75973 | A | 4/2010 | |
| JP | 2013-88326 | A | 5/2013 | |
| JP | 2013-217906 | A | 10/2013 | |
| JP | 2015-111648 | A | 6/2015 | |
| JP | 2017-140662 | A | 8/2017 | |
| JP | 2020-20723 | A | 2/2020 | |
| WO | WO-2013156074 | A1 * | 10/2013 | ............ B23Q 3/103 |
| WO | WO-2021100476 | A1 * | 5/2021 | |

OTHER PUBLICATIONS

International Search Report for PCT/JP2020/041347 dated Jan. 19, 2021.

Written Opinion of the International Searching Authority for PCT/JP2020/041347 (PCT/ISA/237) dated Jan. 19, 2021.

Chinese Office Action and Search Report for corresponding Chinese Application No. 202080080859.1, dated Aug. 26, 2022, with an English translation.

* cited by examiner

SURFACE SHAPE MEASURING DEVICE AND SURFACE SHAPE MEASURING METHOD

CROSS-REFERENCE TO RELATED APPLICATIONS

The present application is a Continuation of PCT International Application No. PCT/JP2020/041347 filed on Nov. 5, 2020 claiming priority under 35 U.S.0 § 119(a) to Japanese Patent Application No. 2019-211559 filed on Nov. 22, 2019. Each of the above applications is hereby expressly incorporated by reference, in their entirety, into the present application.

BACKGROUND OF THE INVENTION

1. Field of the Invention

The present invention relates to a surface shape measuring device and a surface shape measuring method, and relates to a technique of using a freely detachable index table.

2. Description of the Related Art

A roundness measuring device for measuring roundness of a workpiece is known as a surface shape measuring device. For example, a roundness measuring device of Japanese Patent Application Laid-Open No. 2001-343228 (hereinafter referred to as "Patent Literature 1") includes a tilt cross table attached to a rotation drive mechanism. A workpiece is placed on the tilt cross table, and then centering and tilting are performed on the workpiece using a tilt cross table such that a center axis of the workpiece and a rotation center axis of the rotation drive mechanism are aligned with each other (which is also referred to as centering operation).

Citation List

Patent Literature 1: Japanese Patent Application Laid-Open No. 2001-343228

SUMMARY OF THE INVENTION

However, since a movable range of the tilt cross table is generally as narrow as several millimeters from the rotation center axis, it is necessary to position the workpiece near the rotation center axis when the workpiece is placed. Therefore, it is not easy to place a plurality of workpieces within the movable range and continuously perform centering on each of the plurality of workpieces.

Therefore, as means for extending the movable range, it is conceivable to add an index table on the tilt cross table. However, the index table serves to drive the table, and does not have any mechanism for suppressing fluctuation of a position of a center of gravity (centroid). Therefore, when a shape measurement is performed while a workpiece is placed on the index table, there is a concern that the measurement accuracy may deteriorate due to the fluctuation of the position of the center of gravity.

The present invention has been made in view of such circumstances, and aims to provide a surface shape measuring device and a surface shape measuring method that are capable of suppressing deterioration in measurement accuracy when a surface shape of a workpiece is measured by using an index table.

A surface shape measuring device according to a first aspect includes: a rotary table which is configured to place a workpiece thereon and to be freely rotatable around a rotation center axis; and a detector including a probe to be brought into contact with the workpiece placed on the rotary table, the detector configured to detect a displacement of the probe, wherein the rotary table has a centering mechanism configured to align a center axis of the workpiece and the rotation center axis, an index table freely detachably mounted on the rotary table is provided, the index table configured so as to be able to perform indexing along a first axis and a second axis which are perpendicular to the rotation center axis, and eccentric load cancelling means configured to cancel an eccentric load caused by the indexing of the index table.

A surface shape measuring device according to a second aspect further includes a sensor configured to detect a tilt amount of the rotation center axis to acquire the eccentric load.

A surface shape measuring device according to a third aspect further includes: a shared drive circuit configured to drive the rotary table and the index table; a switching circuit configured to switch the drive circuit between the rotary table and the index table; and a detachable mechanism configured to electrically connect the switching circuit and the index table.

In a surface shape measuring device according to a fourth aspect, a maximum movable range of the index table is larger than a maximum movable range of the rotary table.

In a surface shape measuring device according to a fifth aspect, a moving speed of the index table is higher than a moving speed of the rotary table.

In a surface shape measuring device according to a sixth aspect, the eccentric load cancelling means is a counterweight provided to the index table, and the counterweight is provided movably in the index table.

In a surface shape measuring device according to a seventh aspect, the eccentric load cancelling means is movement of the rotary table.

A surface shape measuring method according to an eighth aspect is a surface shape measuring method using the above-mentioned surface shape measuring device, the surface shape measuring method including: a placing step of placing a workpiece on either the rotary table or the index table, a detection step of detecting a displacement of the probe which is brought into contact with the workpiece by the detector, and a cancelling step of cancelling an eccentric load before the detection step, in a case where the workpiece is placed on the index table.

According to the present invention, it is possible to suppress deterioration in measurement accuracy in a case where an index table is installed on a rotary table to measure a surface shape of a workpiece.

DESCRIPTION OF THE PREFERRED EMBODIMENTS

Preferred embodiments of the present invention will be described hereunder in detail with reference to the accompanying drawings. A roundness measuring device which is one of surface shape measuring devices of the present invention will be exemplified and described.

[First Embodiment]

Figure 1:
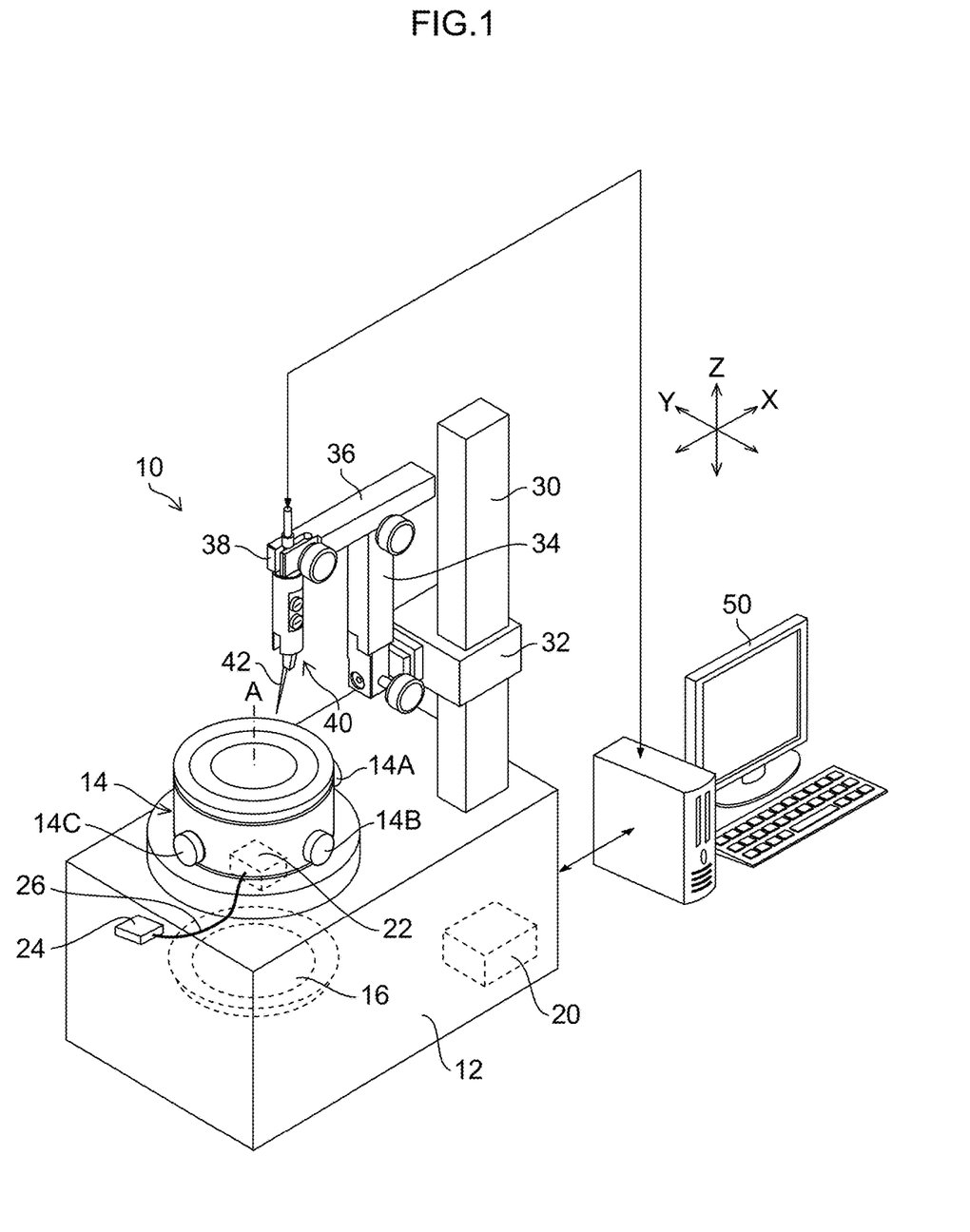
FIG. 1 is a perspective view showing an overall configuration of a roundness measuring device according to a first embodiment.

FIG. 1 is an external perspective view of a roundness measuring device 10. The roundness measuring device 10 includes a box-shaped base 12 for supporting the entire device, and a rotary table 14 that is provided on the base 12 and is configured to be freely rotatable around a rotation center axis A. As described later, a workpiece W (not shown) is placed on the upper surface of the rotary table 14.

Figure 2:
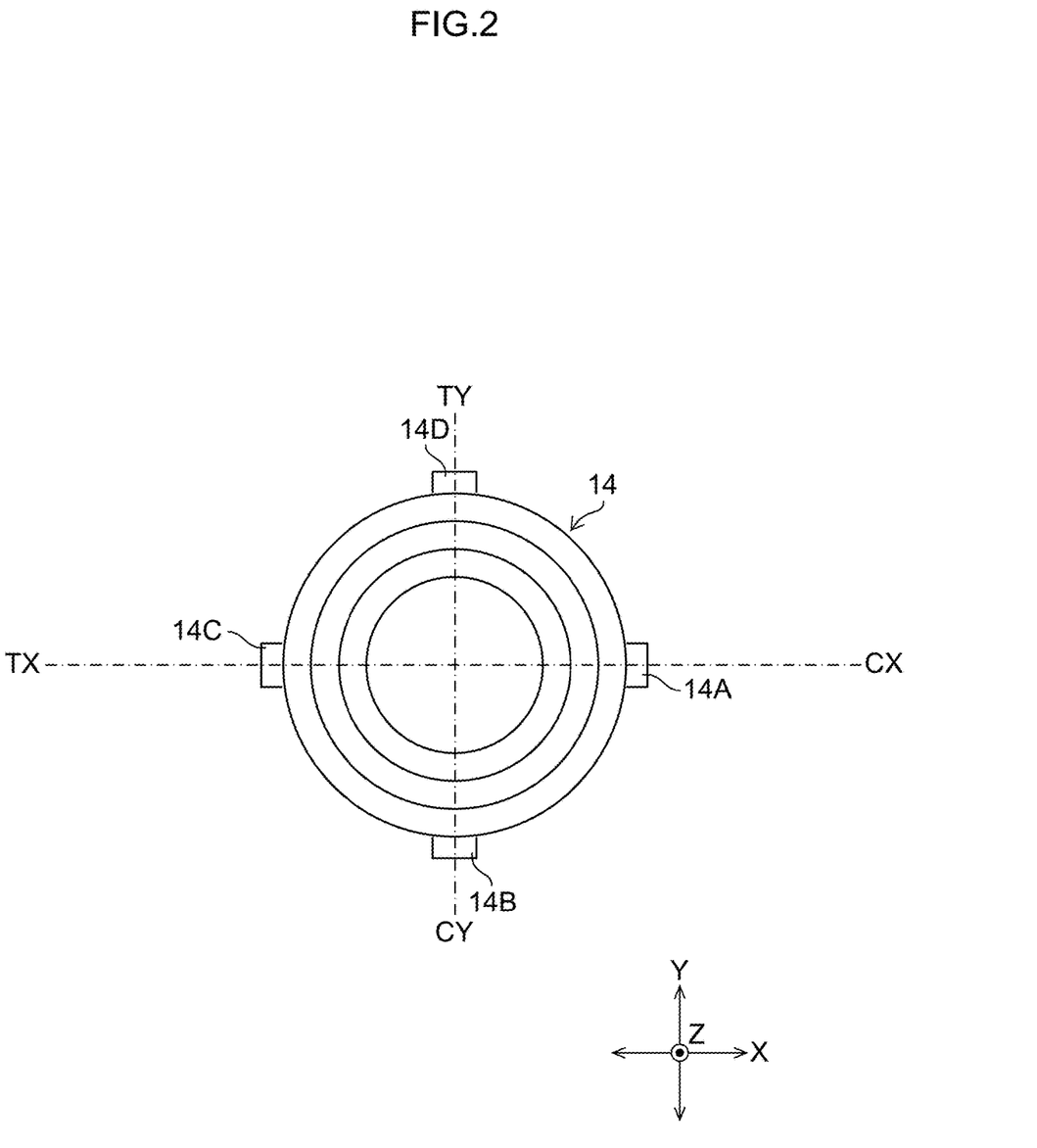
FIG. 2 is a view taken from a top surface of a rotary table of the roundness measuring device in FIG. 1.

As shown in FIG. 2, the rotary table 14 includes: a CX axis moving mechanism 14A; a CY axis moving mechanism 14B; a TX axis moving mechanism 14C; and a TY axis moving mechanism 14D. In coordinate axes consisting of a CX axis parallel to an X direction and a CY axis parallel to a Y direction and perpendicular to the CX axis with the rotation center axis A as an origin, the CX axis moving mechanism 14A and the CY axis moving mechanism 14B move the rotary table 14 in a horizontal direction with respect to the CX axis and the CY axis. Further, in coordinate axes consisting of a TX axis parallel to the X direction and a TY axis parallel to the Y direction and perpendicular to the TX axis with the rotation center axis A as an origin, the TX axis moving mechanism 14C and the TY axis moving mechanism 14D tilts the rotary table 14 with respect to the TX axis and the TY axis.

As shown in FIG. 1, a rotary bearing 16 and a rotary shaft (not shown) supported by the rotary bearing 16 are arranged inside the base 12. The rotary table 14 is driven to rotate by the rotation of the rotary shaft. The rotary shaft corresponds to the rotation center axis A. The rotary shaft is driven to rotate by, for example, a motor (not shown) or the like. The rotary bearing 16 includes, for example, an air bearing.

A drive circuit 20 is arranged inside the base 12. The drive circuit 20 controls the driving of a centering mechanism in the rotary table 14 and an index table 60 (see FIG. 3) described later. The rotary table 14 is provided with a switching circuit 22. The switching circuit 22 switches the drive circuit 20 between the rotary table 14 and the index table 60. The drive circuit 20 functions as a shared drive circuit 20 for the rotary table 14 and the index table 60 through the switching circuit 22. A first connector 24 is connected to the switching circuit 22 via a first cable 26.

The roundness measuring device 10 includes a column 30 which is provided on the upper surface of the base 12 and extends in a Z direction (vertical direction). The column 30 supports a carriage 32 that is movable in the Z direction along the column 30. The carriage 32 may be moved in an up-and-down direction, for example, by driving a motor, or may be manually moved by a rotation operation of a knob or the like.

One end of a swivel arm (swing arm) 34 is supported by the carriage 32. The swivel arm 34 is supported at the one end of the swivel arm 34 by the carriage 32 so as to freely swivel (turn) around the X direction as a swivel center.

The other end of the swivel arm 34 supports a horizontal arm 36. The horizontal arm 36 is configured to extend in the X direction and be movable in the X direction (horizontal direction). A detector older 38 is attached to a tip of the horizontal arm 36. A detector 40 is freely detachably attached to the detector holder 38. The detector 40 has a probe 42 and a displacement detector such as a differential transformer (not shown), on a tip side of the detector 40. The detector 40 detects a displacement of the probe 42 which is in contact with a workpiece (not shown), and outputs a displacement detection signal (electric signal) indicating the displacement to a data processing device 50.

Figure 3:
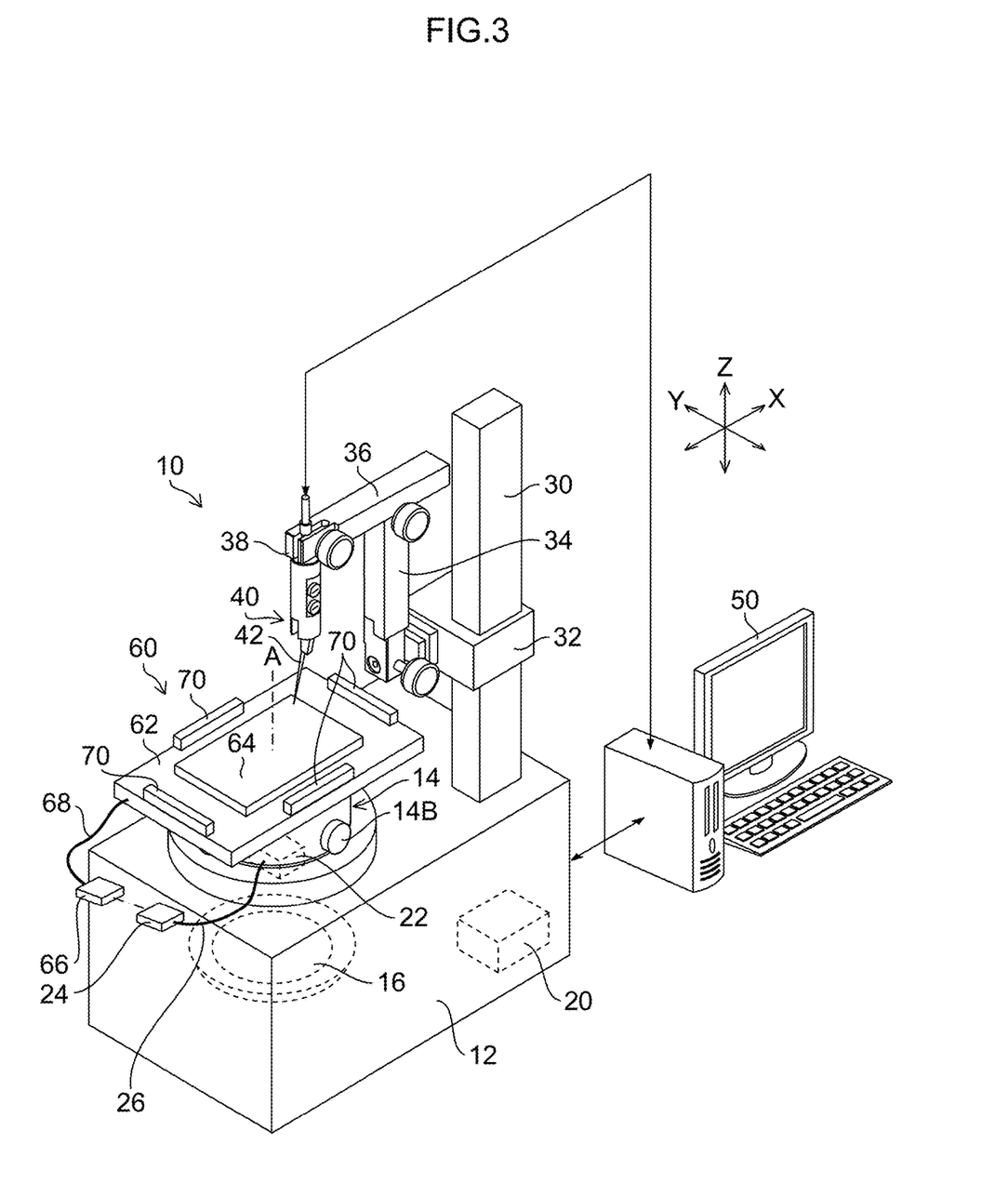
FIG. 3 is a perspective view showing an overall configuration of the roundness measuring device having an index table.

As shown in FIG. 3, in the roundness measuring device 10 according to the embodiment, the index table 60 is freely detachably installed on the rotary table 14. The installation is performed, for example, by fitting a positioning member of the index table 60 into a groove, a hole or the like which has been previously provided in the rotary table 14. However, the installation is not limited to this installation method.

The index table 60 of the present embodiment includes: a first table 62 whose upper surface has a large area; and a second table 64 which is installed to be movable on the first table 62. The second table 64 can perform indexing (indexing feed) on the first table 62 using a motor (not shown) or the like, in a first axis (X direction) and a second axis (Y direction) which are perpendicular to the rotation center axis A. Although the case where the first axis and the second axis are perpendicular to each other is illustrated, any aspect may be possible unless the first axis and the second axis are parallel to each other.

A second connector 66 is connected to the index table 60 via a second cable 68. When the first connector 24 and the second connector 66 are attached to each other, the switching circuit 22 and the index table 60 are electrically connected to each other. The first connector 24 and the second connector 66 are freely detachable. In the present embodiment, the first connector 24 and the first cable 26, and the second connector 66 and the second cable 68 constitute a detachable mechanism. Due to the switching circuit 22 and the detachable mechanism, it is possible to easily perform additional introduction of the index table 60, so-called retrofitting on the existing roundness measuring device 10 shown in FIG. 1.

Before the index table 60 and the switching circuit 22 are electrically connected to each other by the detachable mechanism, the drive circuit 20 drives the rotary table 14. After the index table 60 and the switching circuit 22 are electrically connected to each other by the detachable mechanism, the drive circuit 20 drives the index table 60. Even after they are electrically connected to each other as described above, the drive circuit 20 can optionally switch the drive between the rotary table 14 and the index table 60.

The index table 60 includes four counterweights 70 on the upper surface of the first table 62 along the respective sides of the first table 62. The counterweights 70 are provided so as to be movable along the respective sides inside the index table 60. The counterweights 70 may be provided on the lower surface or the side surfaces of the first table 62. The counterweights 70 will be described later.

The data processing device 50 is, for example, an arithmetic unit such as a personal computer. The data processing device 50 comprehensively controls the drive of each part of the roundness measuring device 10. The data processing device 50 controls the drive of the carriage 32, the swivel arm 34, the horizontal arm 36, the rotary table 14, the drive circuit 20, the index table 60, and the like.

Figure 4:
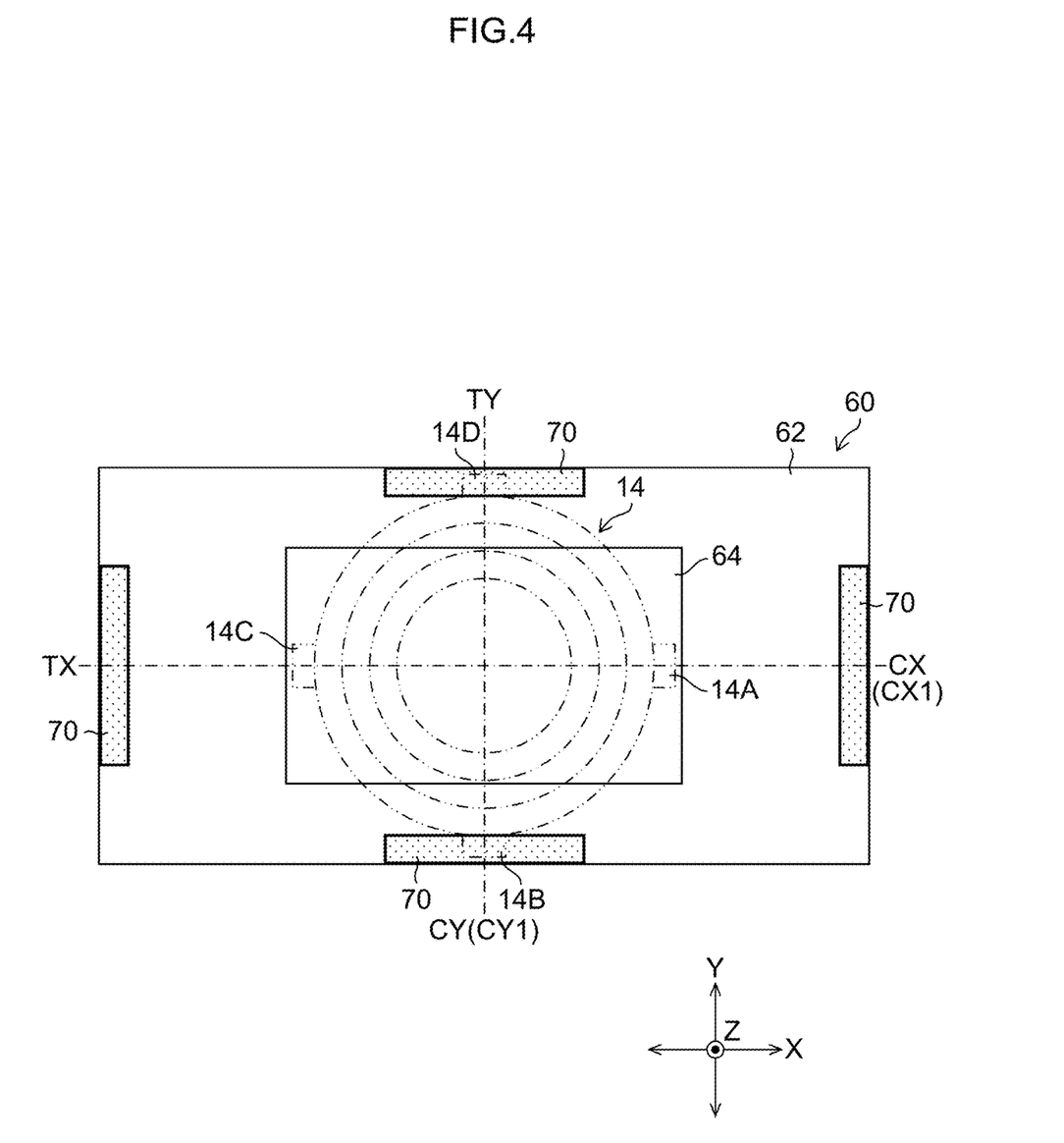
FIG. 4 is a plan view showing a positional relationship between the rotary table and the index table.

As shown in FIG. 4, coordinate axes consisting of a CX1 axis parallel to the X direction and a CY1 axis parallel to the Y direction with the center of the index table 60 as an origin is set to the index table 60. Coordinate axes consisting of a CX axis and a CY axis is set to the rotary table 14. It is preferable that the rotary table 14 and the index table 60 are installed so that the coordinate axes (CX axis, CY axis) of the rotary table 14 and the coordinate axes (CX1 axis, CY1 axis) of the index table 60 have the same locus.

Next, a roundness measurement (surface shape measuring method) of the workpiece by the roundness measuring device 10 shown in FIGS. 1 and 4 will be described with reference to FIGS. 5 to 10. FIGS. 5 to 10 conceptually show the roundness measuring device 10.

Figure 5:
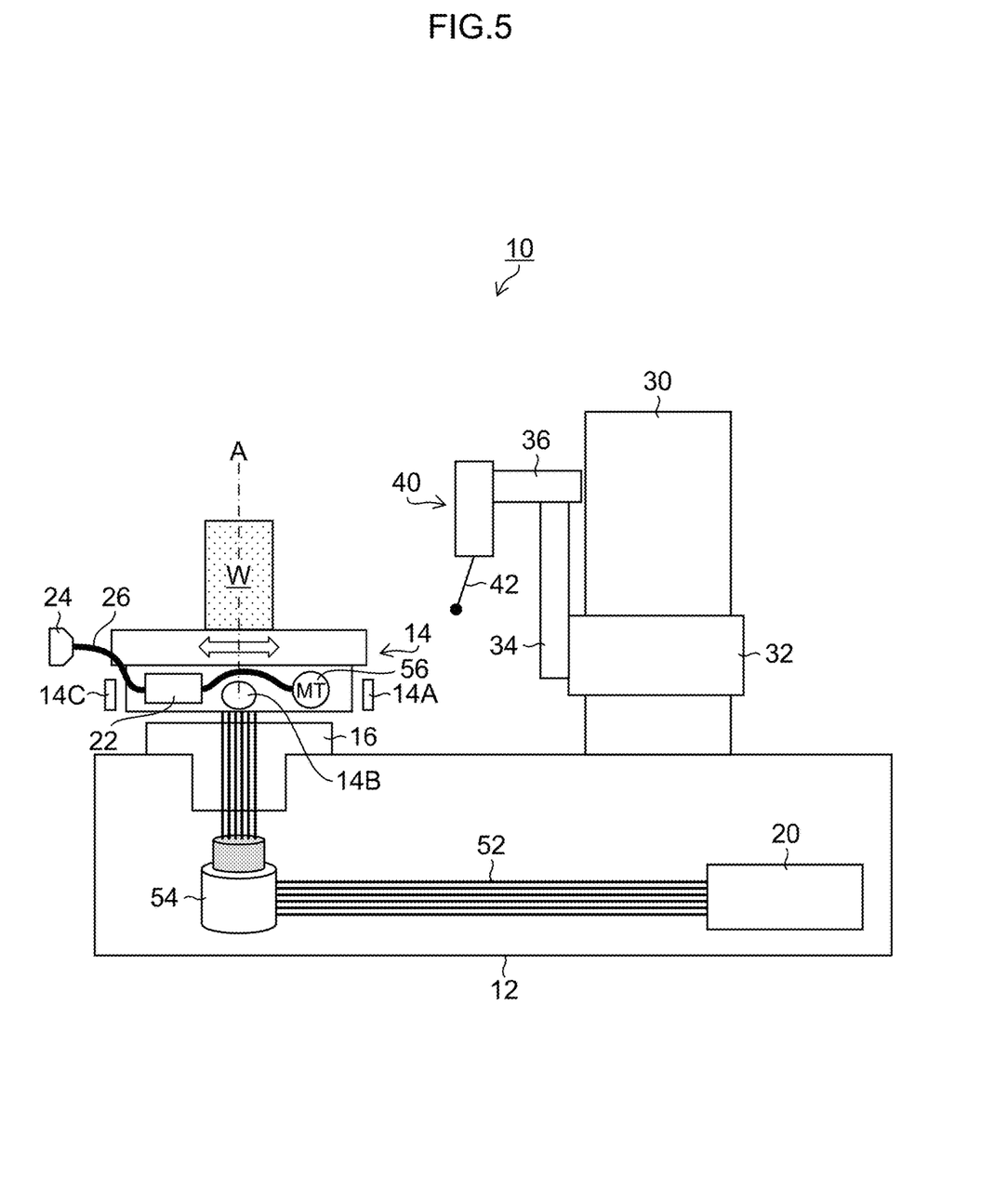
FIG. 5 is a conceptual diagram showing a state in which a workpiece is placed on the roundness measuring device in FIG. 1.

FIG. 5 is the roundness measuring device 10 shown in FIG. 1, and shows a state in which a workpiece W is placed on the rotary table 14 of the roundness measuring device 10. A power signal line 52 for transmitting power and a drive signal from the drive circuit 20, and a slip ring 54 are arranged inside the base 12. A motor 56 is provided in the rotary table 14. Power and a drive signal are transmitted to the rotary table 14 via the slip ring 54. The motor 56 can horizontally move the rotary table 14 along the CX axis and the CY axis (see FIG. 2) as indicated by arrows.

Figure 6A:
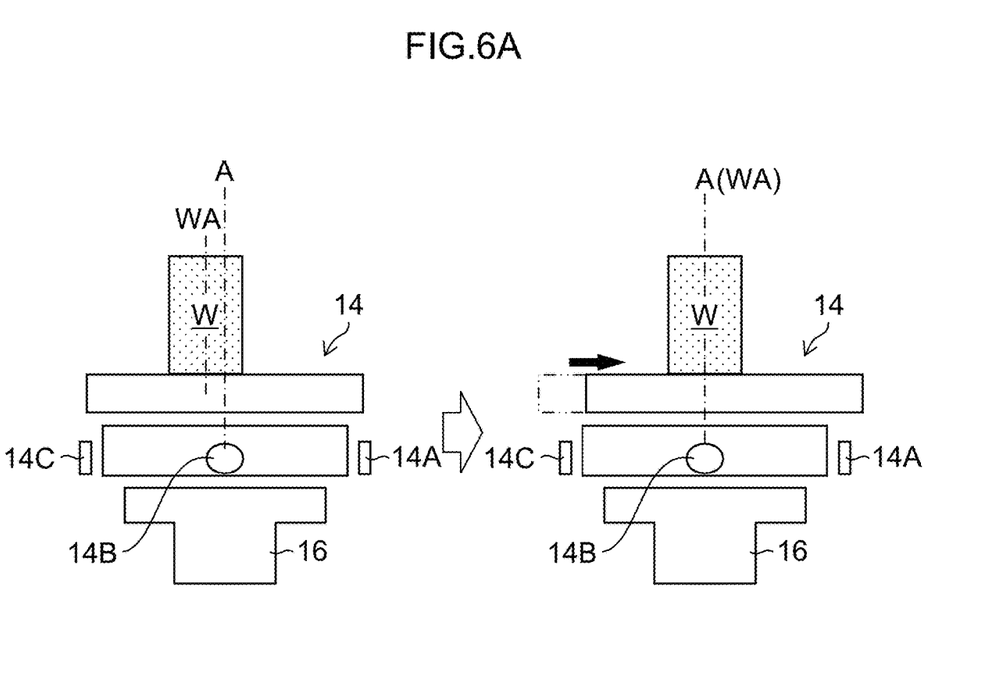
FIGS. 6A and 6B are conceptual diagrams showing a centering operation for the workpiece.
Figure 6B:
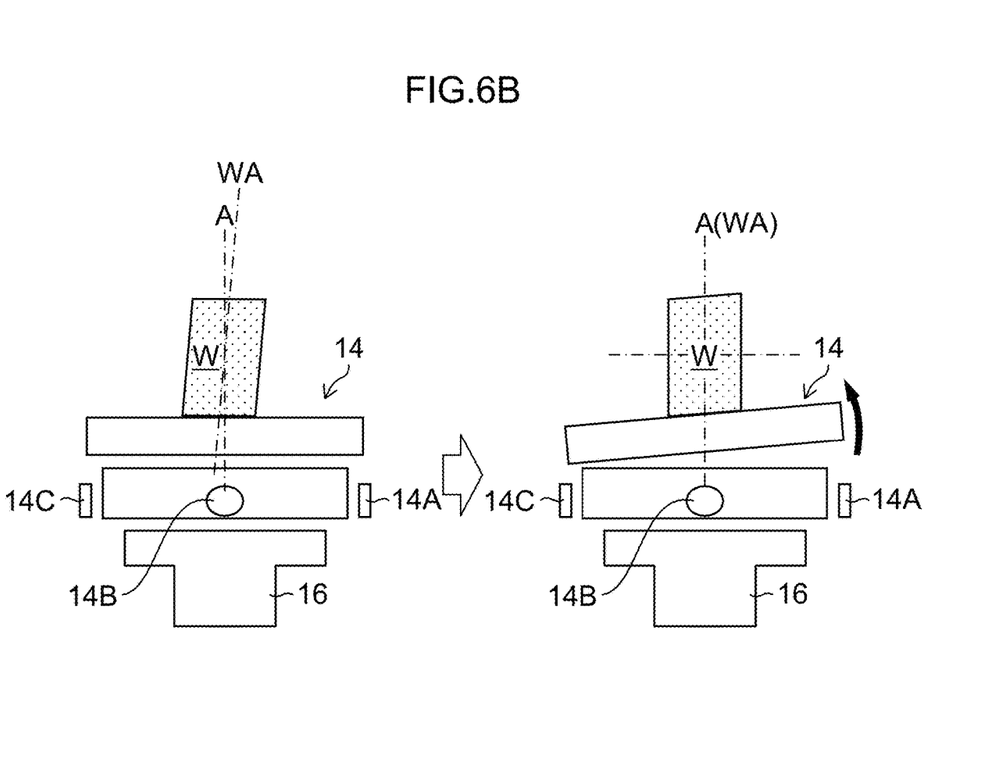

When the workpiece W is measured by the roundness measuring device 10, centering is performed by the centering mechanism as shown in FIGS. 6A and 6B before the measurement. "Centering" means that the central axis of the workpiece W and the rotation center axis A of the rotary table 14 are adjusted to match each other.

As shown in FIG. 6A, when the workpiece center axis WA of the workpiece W and the rotation center axis A do not match each other (a diagram on the left side of FIG. 6A), the rotary table 14 is finely fed in the CX axis direction and the CY axis direction by the CX axis moving mechanism 14A and the CY axis moving mechanism 14B (see FIG. 2) to be moved in the horizontal direction. As a result of the movement of the rotary table 14 in the horizontal direction, the workpiece center axis WA of the workpiece W and the rotation center axis A match each other (a diagram on the right side of FIG. 6A). However, the movable range of the rotary table 14 by the CX axis moving mechanism 14A and the CY axis moving mechanism 14B is generally as small as about several mm.

In FIG. 6A, the adjustment is performed as follows. First, the workpiece W is placed on the rotary table 14 so that the central axis of the cylindrical surface of the workpiece W roughly match the center of the rotation center axis A. Next, the position of the probe 42 is adjusted so that the probe 42 comes into contact with a measurement position of the workpiece W. The workpiece W is rotated in this state, and an eccentric distance between the workpiece center axis WA of the workpiece W and the rotation center axis A of the rotary table 14 is measured. The CX axis moving mechanism 14A and the CY axis moving mechanism 14B can be moved by the motor 56 or the like based on a measurement result.

Next, as shown in FIG. 6B, in a case where the workpiece center axis WA of the workpiece W and the rotation center axis A are not parallel to each other (the diagram on the left side of FIG. 6B), the rotary table 14 is finely tilted with respect to the TX axis direction and the TY axis direction by the TX axis moving mechanism 14C and the TY axis moving mechanism 14D (see FIG. 2). As a result of tilting the rotary table 14, the workpiece center axis WA of the workpiece W and the rotation center axis A become parallel to each other (the diagram on the right side of FIG. 6B).

When the roundness of the workpiece W is measured by the roundness measuring device 10 of FIG. 1, the carriage 32, the swivel arm 34, and the horizontal arm 36 are driven to bring the probe 42 into contact with the measurement position of the workpiece W (the outer peripheral surface of the workpiece W) placed on the rotary table. Next, a displacement detection signal is acquired from the detector 40 while the workpiece W is rotated via the rotary bearing 16 and the rotary table 14, and the displacement detection signal for one rotation of the workpiece W is output to the data processing device 50. The data processing device 50 processes (analyzes) the displacement detection signal input from the detector 40 to generate measurement data indicating the roundness of the workpiece W.

Figure 7:
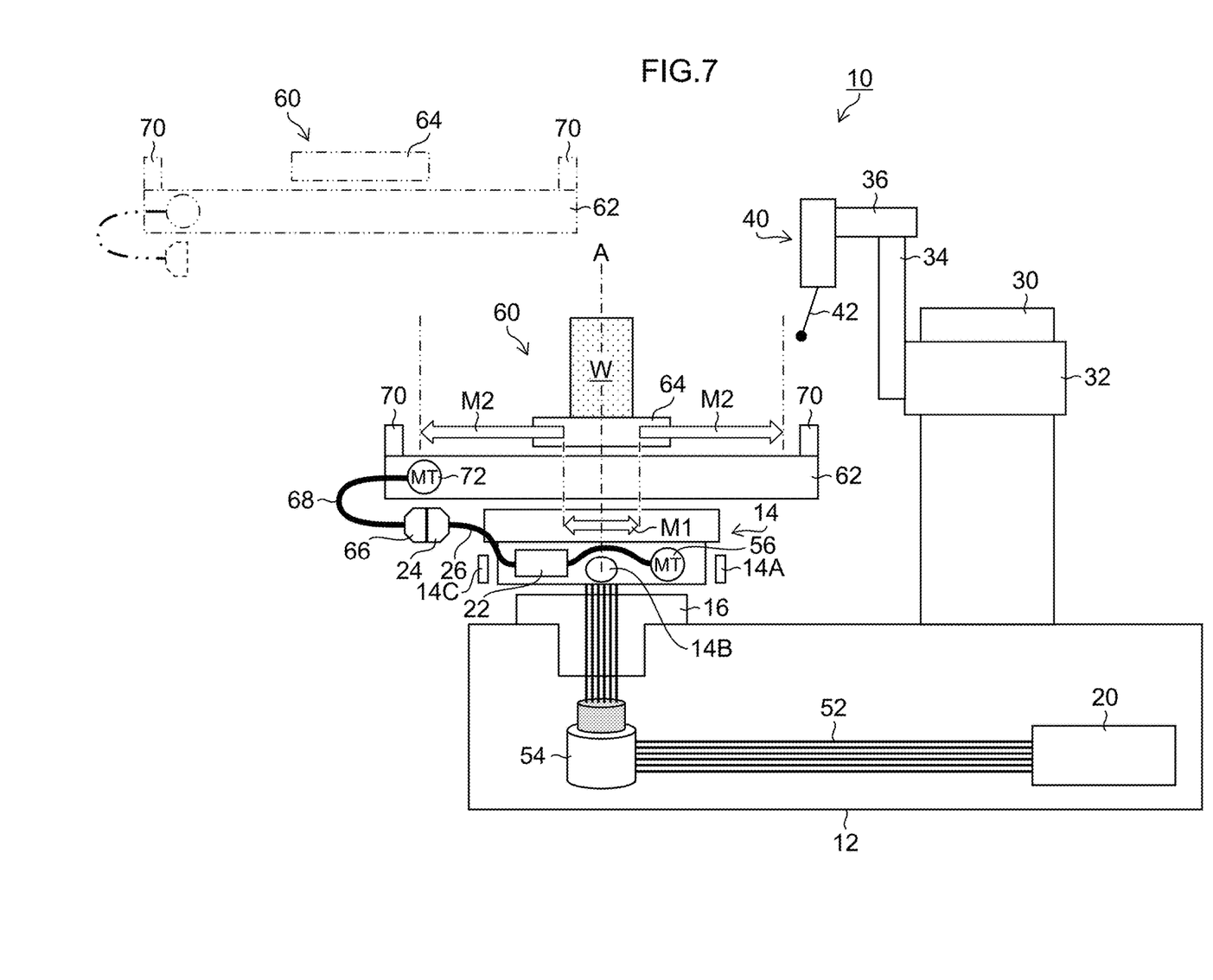
FIG. 7 is a conceptual diagram showing a state in which a workpiece is placed on the roundness measuring device in FIG. 3.

FIG. 7 shows the roundness measuring device 10 shown in FIG. 3. FIG. 7 shows the roundness measuring device 10 in a state where the index table 60 is installed on the rotary table 14 and the workpiece W is placed on the index table 60 of the roundness measuring device 10. The first connector 24 and the second connector 66 are connected to each other. The second cable 68 is connected to a motor 72 provided in the first table 62 of the index table 60.

Because the index table 60 is installed on the rotary table 14, it is possible to extend a range in which centering can be performed. As shown in FIG. 7, a maximum movable range M2 of the index table 60 is larger than a maximum movable range M1 of the rotary table 14. The movable range in which centering can be performed is the sum of the movable range M1 of the centering mechanism of the rotary table 14 and the movable range M2 of the index table 60. This configuration makes it possible to place a plurality of workpieces W on the index table 60 and sequentially measure the shapes of the plurality of workpieces W.

The drive circuit 20 of the centering mechanism of the rotary table 14 is shared as the drive circuit 20 of the index table 60 so that the index table 60 does not need any dedicated drive circuit. In a case where the drive circuit is provided in the index table 60, heat generated from the drive circuit causes deterioration in accuracy. However, in the embodiment, because the index table 60 is driven by the drive circuit 20 provided in the base 12, it is possible to minimize heat generation that affects the index table 60. Since the drive circuit 20 can be shared by the switching circuit 22, an existing roundness measuring device can be modified at low cost such that the index table 60 can be used.

Even when the rotary table 14 and the index table 60 share the drive circuit 20, it is possible to control the rotary table 14 and the index table 60 by automatically recognizing the attachment/detachment of the first connector 24 and the second connector 66 with software and changing control resolution of the drive circuit 20. In the case of high control resolution, the moving distance is small for a drive signal, and the high control resolution is applied to the control of the rotary table 14. In other words, the rotary table 14 is finely moved by the motor 56 of the centering mechanism or the like. On the other hand, in the case of low control resolution, the moving distance is large for a drive signal, and the low control resolution is applied to the control of the index table 60. In other words, the index table 60 can be moved more greatly than the rotary table 14 by the motor 72. In a case where the drive circuit 20 is shared, as shown in FIG. 4, the coordinate axes of the rotary table 14 are made to coincide with the coordinate axes of the index table 60 such that the rotary table 14 and the index table 60 can be controlled only by changing the control resolution. However, even in a case where the coordinate axes of the rotary table 14 do not coincide with the coordinate axes of the index table 60, the rotary table 14 and the index table 60 can be controlled by generating a correction signal.

When the movable range is extended by applying the index table 60, there is a concern that the center of gravity of loads (the rotary table 14, the index table 60, and the workpiece W) installed on the rotary bearing 16 and the rotation center axis A are located apart from each other. In a case where there is a deviation between the center of gravity and the rotation center axis A, that is, an eccentric load, the rotation accuracy deteriorates, which causes deterioration in measurement accuracy. Therefore, the roundness measuring device 10 includes eccentric load cancelling means for cancelling the generated eccentric load. As shown in FIGS. 3 and 7, the roundness measuring device 10 according to the first embodiment includes four counterweights 70 provided on the index table 60 as the eccentric load cancelling means, and each counterweight 70 is provided so as to be movable along the side of the first table 62. Here, the cancellation of the eccentric load may be performed such that the eccentric load is suppressed (or reduced) before and after the operation of the eccentric load cancelling means. The counterweight 70 is freely movable based on a control signal from the data processing device 50 by a drive device including a motor and a ball screw or the like, for example.

Figure 8A:
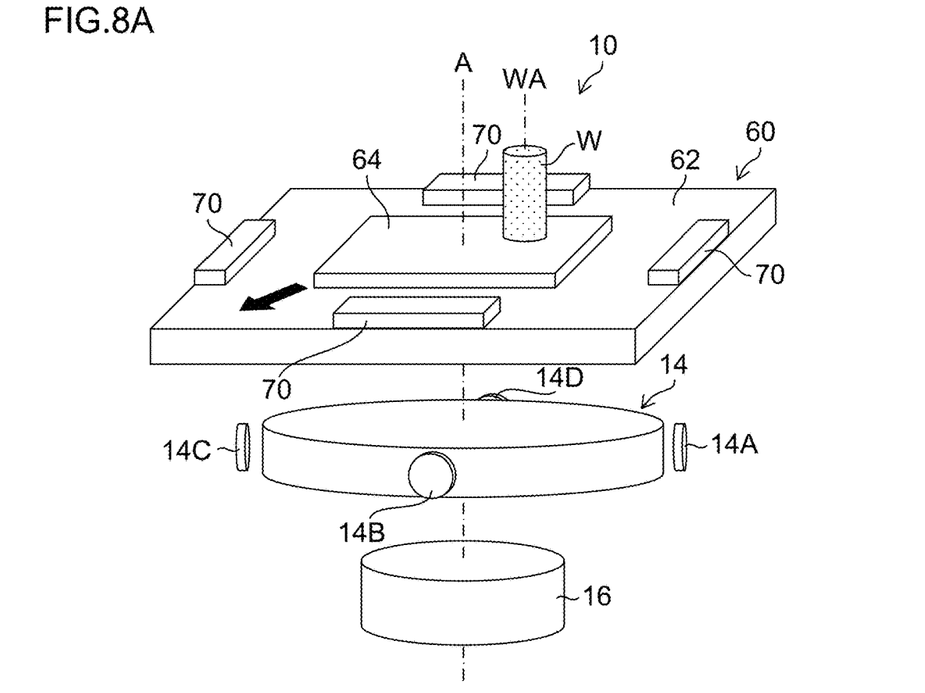
FIGS. 8A and 8B are conceptual diagrams showing an operation of the roundness measuring device shown in FIG. 7.

Next, the operation of the eccentric load cancelling means will be described with reference to FIGS. 8A and 8B. As shown in FIG. 8A, the workpiece W is placed on the second table 64 of the index table 60. The rotation center axis A and the workpiece center axis WA of the workpiece W do not match each other. In order to make the rotation center axis A coincide with the workpiece center axis WA, the second table 64 performs indexing feed in the direction of an arrow.

Figure 8B:
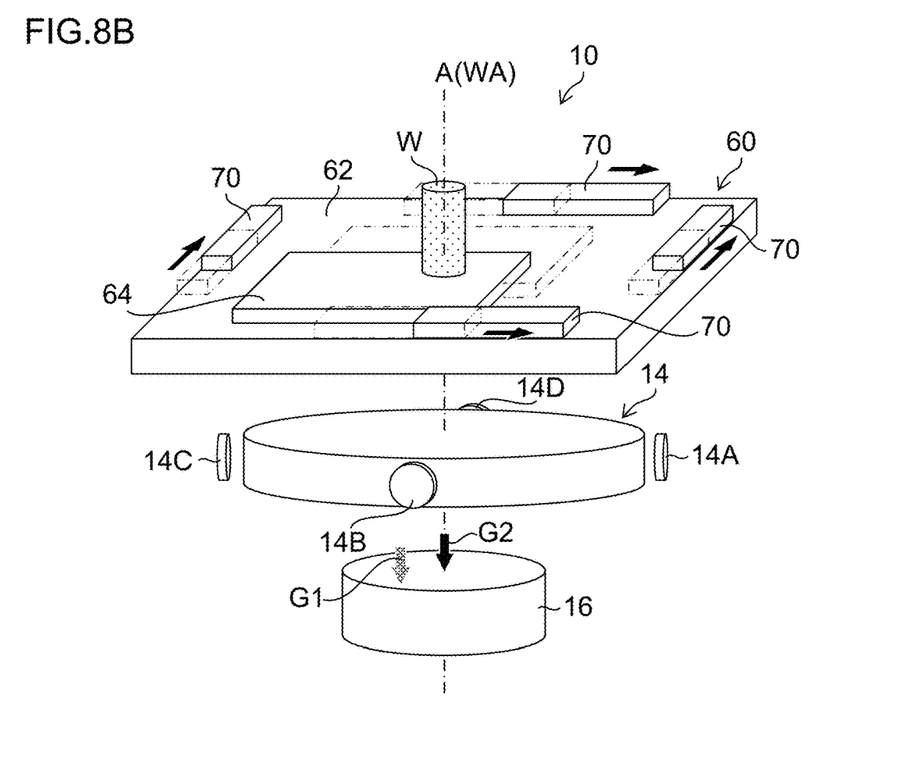

As shown in FIG. 8B, the second table 64 performs the indexing feed such that the rotation center axis A matches the workpiece center axis WA. On the other hand, since the second table 64 moves on the first table 62, the position of the center of gravity of the loads mounted on the rotary bearing 16 moves to the center of gravity G1. Since the center of gravity G1 does not match the rotation center axis A, an eccentric load occurs. Therefore, in order to cancel the eccentric load, the respective counterweights 70 are moved in the directions of arrows. As a result, the position of the center of gravity of the loads changes from the center of gravity G1 to the center of gravity G2, so that the rotation center axis A and the center of gravity G2 match each other.

When the roundness of the workpiece W is measured by the roundness measuring device 10 of FIG. 3, the carriage 32, the swivel arm 34, and the horizontal arm 36 are driven to bring the probe 42 into contact with the measurement position of the workpiece W (the outer peripheral surface of the workpiece W) placed on the index table 60. Next, a displacement detection signal is acquired from the detector 40 while rotating the workpiece W placed on the index table 60 via the rotary bearing 16 and the rotary table 14, and the displacement detection signal for one rotation of the workpiece W is output to the data processing device 50. The data processing device 50 processes (analyzes) the displacement detection signal input from the detector 40 to generate measurement data indicating the roundness of the workpiece W (see FIGS. 3 and 7).

Figure 9:
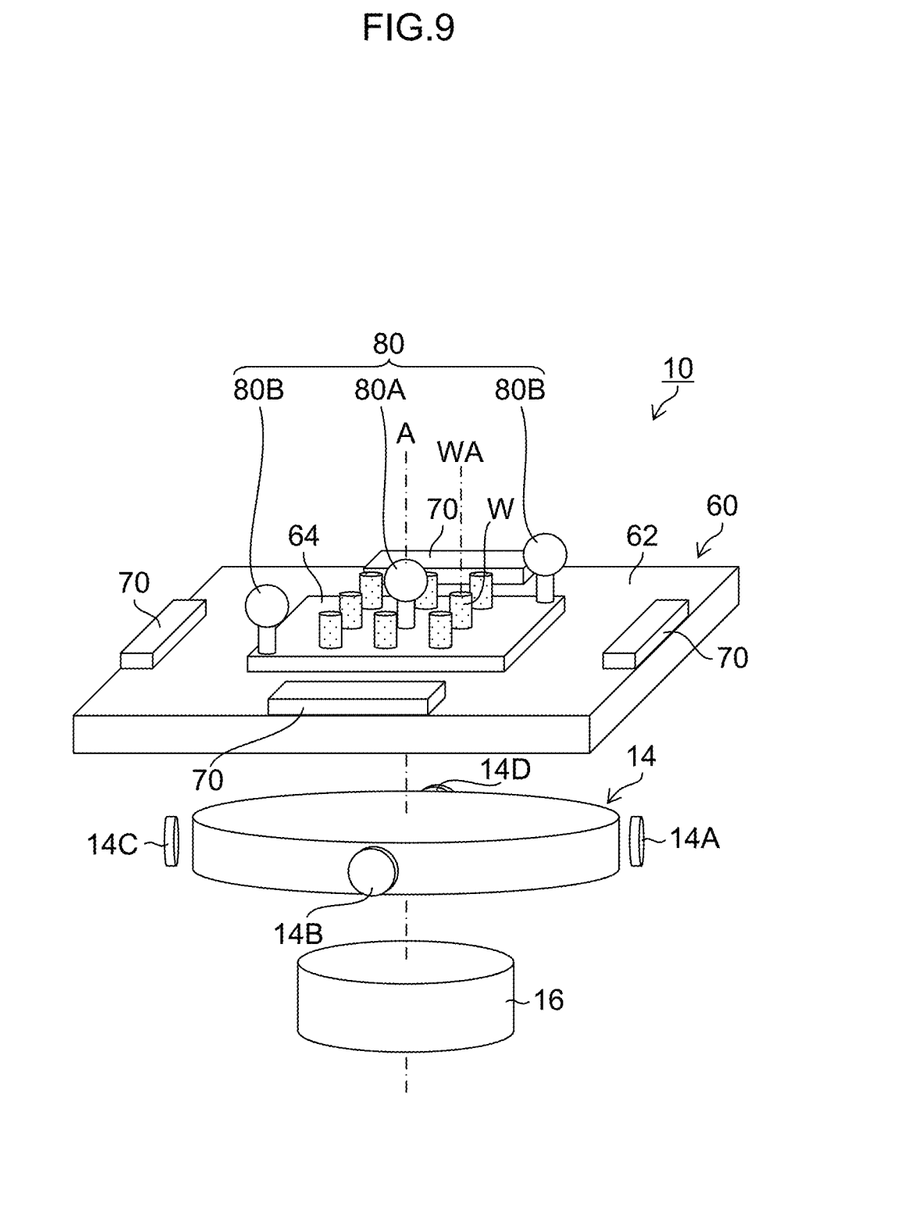
FIG. 9 is a conceptual diagram showing an operation of the roundness measuring device when a plurality of workpieces are measured.

In FIGS. 8A and 8B, only one workpiece W is placed on the index table 60. However, as shown in FIG. 9, a plurality of workpieces W can be placed on the index table 60. In the case of measuring the surface shapes of the plurality of workpieces W, when the surface shape of one workpiece W has been measured, the second table 64 performs indexing feed so as to make the rotation center axis A coincide with the workpiece center axis WA of the workpiece W. Next, the counterweights 70 are moved to match the rotation center axis A and the center of gravity of the loads with each other. Thereafter, the surface shape of a workpiece W is measured. In this way, the plurality of workpieces W on the index table 60 can be sequentially measured.

Further, because calibration masters 80 (80A, 80B) are arranged on the index table 60, it is possible to perform accuracy check and calibration at any timing during the sequential measurement of the workpieces W. Further, as shown in FIG. 9, because the calibration master 80A is arranged in the center of the index table 60, calibration can be performed highly accurately, without being affected by the eccentric load.

Further, the calibration masters 80B may also be arranged at the end parts of the index table 60. The eccentric load can be acquired from calibration data of the calibration masters 80B while the workpieces W are sequentially measured. The eccentric load can be cancelled by moving the counterweights 70 based on the acquired eccentric load. The eccentric load can be acquired from the difference between the calibration data acquired from the two calibration masters 80B placed at both the end parts.

FIG. 9 illustrates a case where the where an eccentric load is acquired on-line, that is, during measurement. However, the eccentric load may be acquired in advance from the calibration data offline and the counterweights 70 may be moved based on the eccentric load such that the eccentric load is cancelled.

Further, a sensor (not shown) may be provided in the rotary bearing 16 to detect a tilt amount of the rotation center axis A with respect to a center axis of the rotary bearing 16 so as to acquire the eccentric load.

Figure 10:
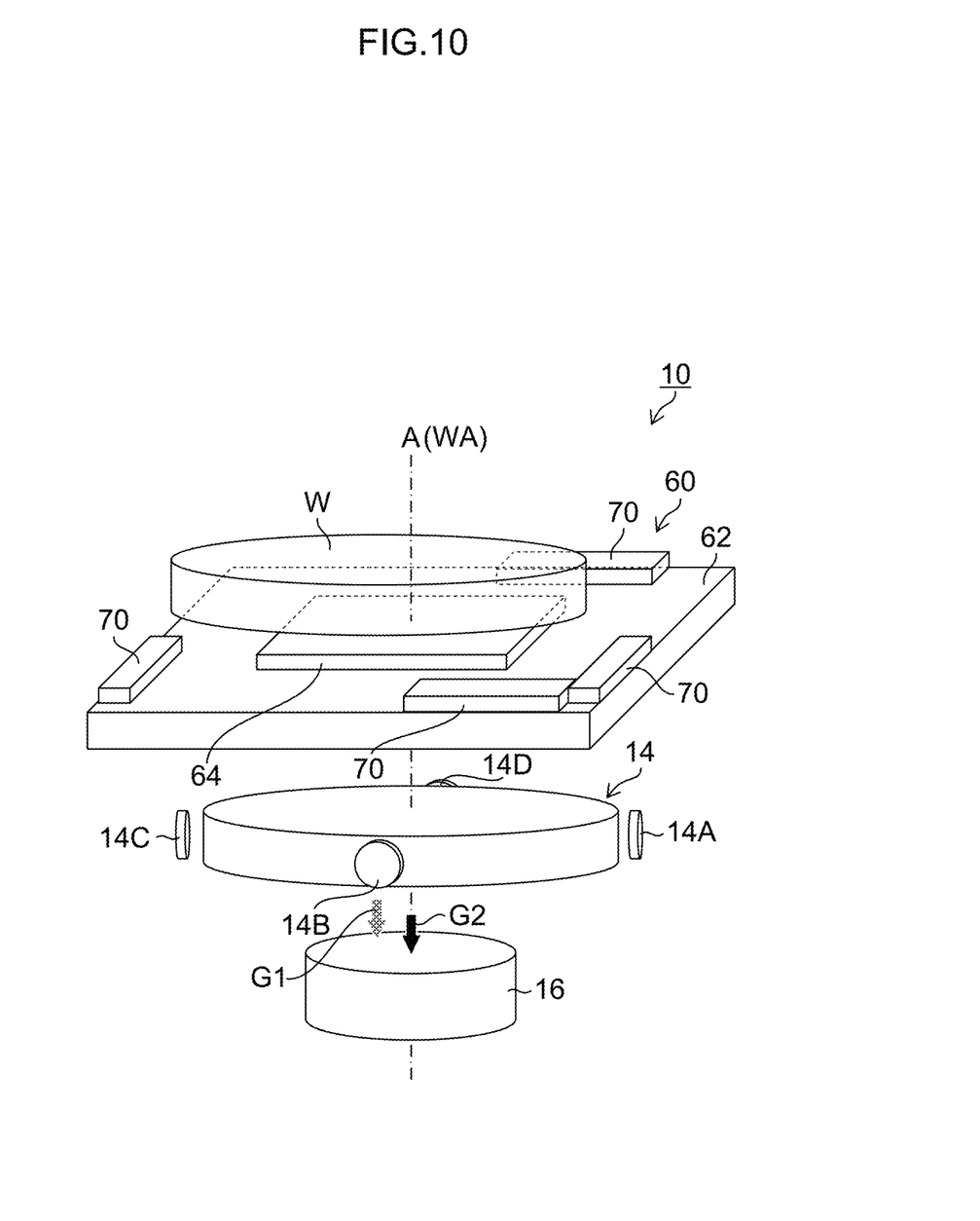
FIG. 10 is a conceptual diagram showing an operation of the roundness measuring device when measuring a workpiece whose measurement position is away from the position of the center of gravity.

FIG. 10 is a conceptual diagram showing the operation of the roundness measuring device in a case where a workpiece whose measurement position is away from the position of the center of gravity. As shown in FIG. 10, the center of gravity G1 of the workpiece W and the measurement position are away from each other. The counterweights 70 are moved such that the rotation center axis A and the center of gravity G2 of the workpiece W may be matched with each other. By using the index table 60, it is possible to place a workpiece W to which an eccentric load exceeding an allowable value of the movable range of the normal rotary table 14 is applied. The eccentric load can be cancelled by moving the counterweights 70 with respect to the workpiece W. Further, it is preferable that the counterweights 70 be replaceable depending on a size of workpiece W and a number of workpieces W, and the purpose of measurement.

It is possible to selectively use a fine movement operation and a coarse movement operation properly by arbitrarily switching the drive of the rotary table 14 and the drive of the index table 60, so as to achieve high speed drive and high precision alignment. In other words, in the case of high control resolution, the moving speed of the rotary table 14 can be reduced, and in the case of low control resolution, the moving speed of the index table 60 can be increased. For example, the moving speed of the rotary table 14 which is finely moved is set to several mm/s, and the moving speed of the index table 60 which is coarsely moved is set to several tens to several hundreds mm/s.

[Second Embodiment]

Figure 11:
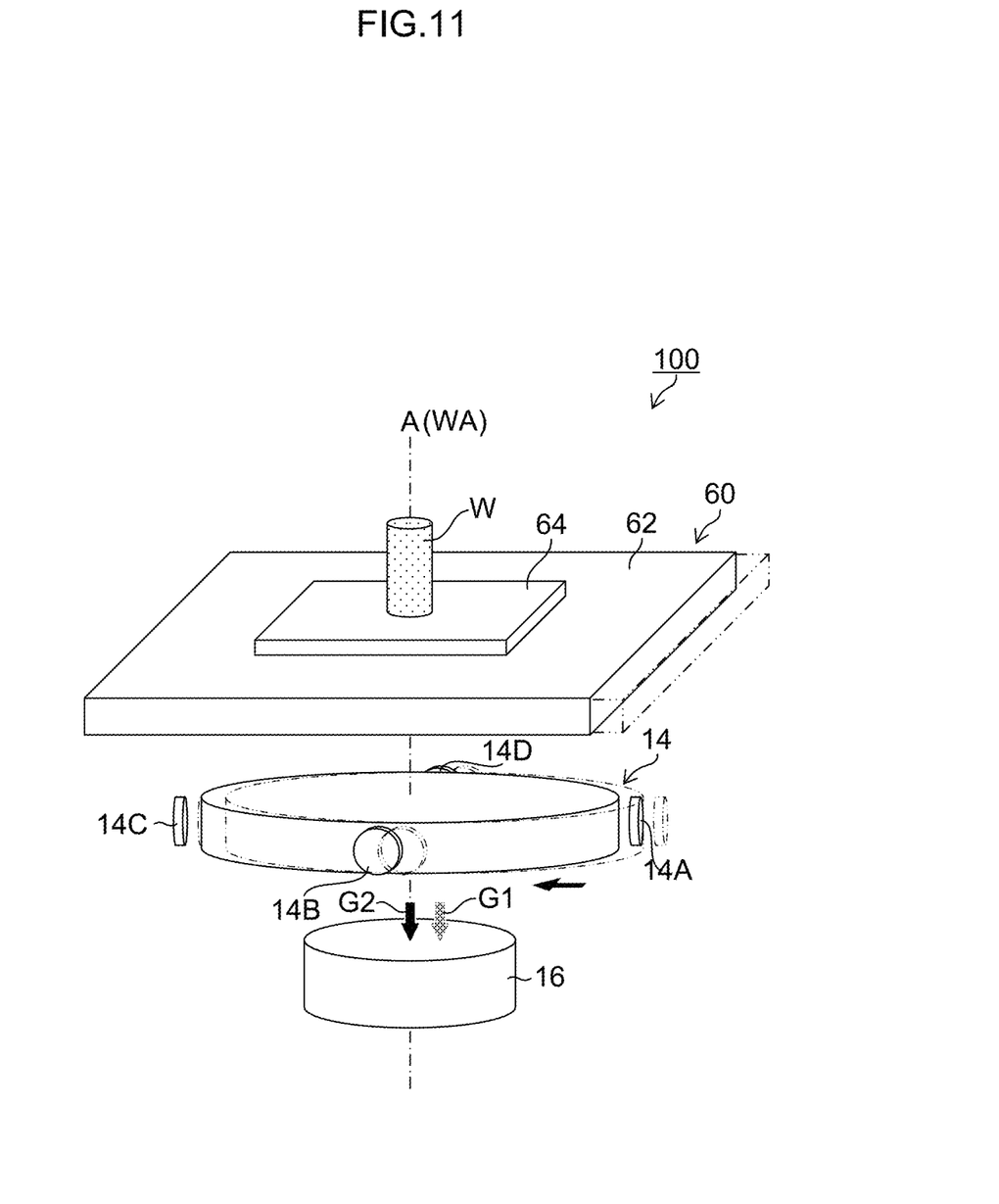
FIG. 11 is a conceptual diagram showing an operation of a roundness measuring device according to a second embodiment.

A roundness measuring device according to a second embodiment will be described with reference to FIG. 11. The same reference signs may be given to the same configurations as those according to the first embodiment, and the description thereof may be omitted. As shown in FIG. 11, unlike the first embodiment, the roundness measuring device 100 does not include the counterweights 70. As to the other configurations, the configuration of the roundness measuring device 100 according to the second embodiment and the configuration of the roundness measuring device 10 according to the first embodiment are basically identical to each other.

In the second embodiment, the rotary table 14 is moved in the direction of an arrow so as to cancel the eccentric load and move the position of the center of gravity from the center of gravity G1 to the center of gravity G2. Note that the index table 60 also moves in company with the movement of the rotary table 14. Therefore, in a case where the rotation center axis A and the workpiece center axis WA do not match each other due to the movement of the rotary table 14, the index table 60 is moved so as to move the workpiece W. The rotary table 14 and the index table 60 are moved sequentially, whereby the rotation center axis A, the workpiece center axis WA and the center of gravity G2 are finally matched with each other.

In the second embodiment, as in the first embodiment, a plurality of workpieces may be measured, and the eccentric load may be acquired online and offline by using the calibration masters. The eccentric load may be acquired by the sensor. The rotary table 14 is moved based on the acquired eccentric load such that the eccentric load can be cancelled.

As the eccentric load cancelling means, the counterweights are exemplified in the first embodiment, and the movement of the rotary table is exemplified in the second embodiment. However, the first embodiment and the second embodiment can be used in combination as the eccentric load cancelling means. Further, the eccentric load cancelling means is not limited to the first embodiment and the second embodiment. Reference Signs List

10 roundness measuring device, 12 base, 14 rotary table, 14A CX axis moving mechanism, 14B CY axis moving mechanism, 14C TX axis moving mechanism, 14D TY axis moving mechanism, 16 rotary bearing, 20 drive circuit, 22 switching circuit, 24 first connector, 26 first cable, 30 column, 32 carriage, 34 swivel arm, 36 horizontal arm, 38 detector holder, 40 detector, 42 probe, 50 data processing device, 52 power signal line, 54 slip ring, 56 motor, 60 index table, 62 first table, 64 second table, 66 second connector, 68 second cable, 70 counterweight, 72 motor, 80, 80A, 80B calibration master, 100 roundness measuring device, A rotation center axis, G1 center of gravity, G2 center of gravity, W workpiece, WA workpiece center axis.

What is claimed is:

1. A surface shape measuring device including:
    a rotary table which is configured to place a workpiece thereon and to be freely rotatable around a rotation center axis; and
    a detector including a probe to be brought into contact with the workpiece placed on the rotary table, the detector configured to detect a displacement of the probe,
    wherein the rotary table has a centering mechanism configured to align a center axis of the workpiece and the rotation center axis,
    an index table freely detachably mounted on the rotary table is provided, the index table configured so as to be able to perform indexing along a first axis and a second axis which are perpendicular to the rotation center axis, and
    eccentric load cancelling means configured to cancel an eccentric load caused by the indexing of the index table is provided.

2. The surface shape measuring device according to claim 1, further comprising
    a sensor configured to detect a tilt amount of the rotation center axis to acquire the eccentric load.

3. The surface shape measuring device according to claim 1, further comprising:
    a shared drive circuit configured to drive the rotary table and the index table;
    a switching circuit configured to switch the drive circuit between the rotary table and the index table; and
    a detachable mechanism configured to electrically connect the switching circuit and the index table.

4. The surface shape measuring device according to claim 1, wherein a maximum movable range of the index table is larger than a maximum movable range of the rotary table.

5. The surface shape measuring device according to claim 1, wherein a moving speed of the index table is higher than a moving speed of the rotary table.

6. The surface shape measuring device according to claim 1, wherein the eccentric load cancelling means is a counterweight provided to the index table, and the counterweight is provided movably in the index table.

7. The surface shape measuring device according to claim 1, wherein the eccentric load cancelling means is movement of the rotary table.

8. A surface shape measuring method using the surface shape measuring device according to claim 1, comprising:
    a placing step of placing a workpiece on either the rotary table or the index table;
    a detection step of detecting a displacement of the probe which is brought into contact with the workpiece by the detector; and
    a cancelling step of cancelling an eccentric load before the detection step, in a case where the workpiece is placed on the index table.

* * * * *